J. W. RUMSEY.
CAR DOOR.
APPLICATION FILED FEB. 2, 1911.
1,027,156.
Patented May 21, 1912.
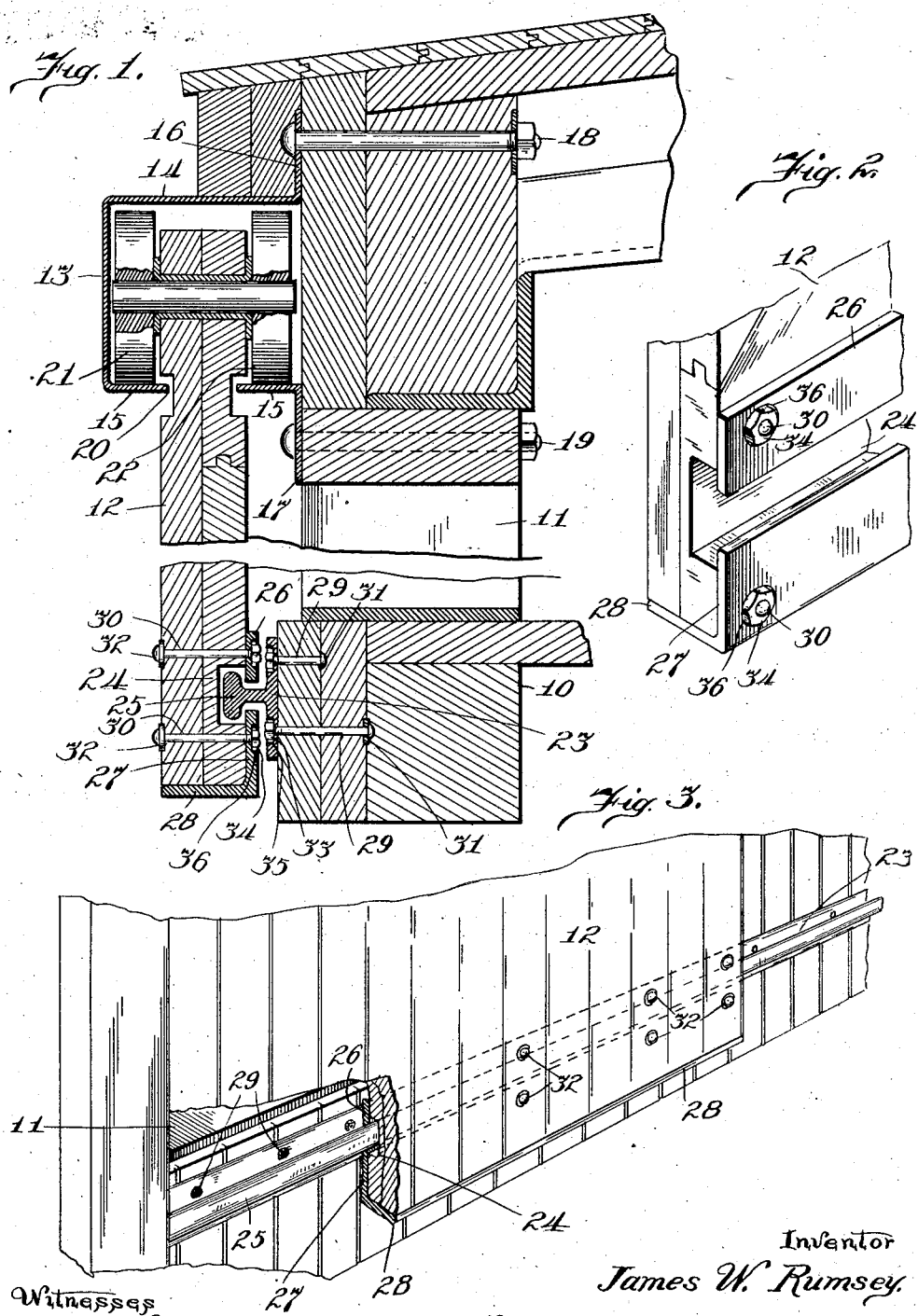
Witnesses
Milton Lenoir
E. M. Klatcher
Inventor
James W. Rumsey.
By
Gillson & Gillson
Attorneys.

UNITED STATES PATENT OFFICE.

JAMES W. RUMSEY, OF CHICAGO, ILLINOIS, ASSIGNOR OF ONE-HALF TO ALVIN W. BAKER, OF OAKLAND, CALIFORNIA.

CAR-DOOR.             REISSUED

1,027,156.         Specification of Letters Patent.   Patented May 21, 1912.

Original application filed November 17, 1910, Serial No. 592,917. Divided and this application filed February 2, 1911. Serial No. 606,274.

*To all whom it may concern:*

Be it known that I, JAMES W. RUMSEY, a citizen of the United States, and resident of Chicago, county of Cook, and State of Illinois, have invented certain new and useful Improvements in Car-Doors, of which the following is a specification, and which are illustrated in the accompanying drawings, forming a part thereof.

The invention relates to car doors, and has been divided out of my pending application for patent on car doors filed November 17th, 1910, Serial No. 592,917.

The invention relates more specifically to means for guidedly supporting and retaining the lower edge of a sliding car door; and the object of the invention is to provide a car door guide which shall engage the door for its entire width and which shall hold the door against the side of the car to prevent unauthorized persons from gaining entrance to the car by swinging the door outwardly from the car body.

The invention contemplates guiding means which may be used in place of the usual car door brackets, such brackets being then entirely dispensed with. While effective provision has been made for preventing the unauthorized removal of car door brackets, nevertheless when such brackets are used access to the interior of the car without sliding the door is frequently obtained by breaking off that portion of the bracket which overlaps the door, whereupon the lower part of the door may be swung away from the car body a sufficient distance to permit a person to enter the door opening.

The invention further contemplates that the door shall be guidedly supported across its entire width, in order that it may not be sprung out of shape by pressure of freight against any part of the door from the inside.

In the accompanying drawings Figure 1 is a detail transverse sectional view of a car body equipped with a door in the manner provided by the invention, the central portion of the door and car wall being broken away; Fig. 2 is a perspective view showing details of the inside face and one edge of the car door; and Fig. 3 is a detail perspective view of the side wall of the car and door, some of the parts being broken away to show the internal construction.

Details of the side wall of a car are shown at 10. The car has the usual side door opening 11, and the door 12 slides over the opening. The upper edge of the door may be slidingly supported in any convenient manner. As shown, a combined door track and hood 13 extends over the top of the door opening 11. This combined door track and hood comprises a channeled plate having upper and lower horizontal webs 14, 15, and vertical marginal flanges 16, 17. The vertical flanges 16, 17, are secured to the car body by bolts 18, 19. The lower horizontal web 15 of the combined track and hood is longitudinally slotted intermediate its ends, as indicated at 20, to receive the upper edge of the door 12, and rollers 21, 22, are secured to the door to roll on the upper face of the web 15 at each side of the slot 20.

In carrying out the invention a T rail 23 is secured to the side wall of the car below the door opening 11. This T rail preferably extends horizontally along the side wall of the car a sufficient distance to be engaged by the door throughout its entire width when the door is in either its open or closed position. The inside face of the door 12 is horizontally slotted, as indicated at 24, to receive the head 25 of the T rail 23. To securely hold the door against the side of the car metal bars 26, 27, are secured to the inside face of the door above and below the slot 24. The edges of these bars overlie the slot and are preferably separated a less distance than the width of the T head 25 of the rail 23. The bar 27 is preferably made in the form of an angle having a horizontal flange 28 which underlies the lower edge of the door for its entire width, thus serving as a binding or protection for the lower edge of the door when the latter is made of wood, as shown. The T rail 23 is secured to the car by bolts 29 passed through the flanges of the T rail and through the side wall 10 of the car. The bars 26, 27, are secured to the door 12 by bolts 30 which are passed through the bars and through the door. If now the bolts 29 are so disposed that their heads 31 come upon the inside of the side wall 10 of the car, and the bolts 30 are so disposed that their heads 32 come upon the outside of the car door 12, unauthorized removal of the bolts may be prevented by riveting over the ends 33, 34, of the bolts upon the nuts, as 35, 36, applied thereto. Preferably the nuts 35 and 36 are countersunk in the flanges of the T rail 23 and in the bars 26, 27, respectively, to provide for a close fit of the door against the side wall of the car. By the use of the T rail 23 and bars 26, 27, a sliding bearing for the lower edge of the door is provided across its entire width, and distortion of the door as by pressure of freight upon its inside face is effectually prevented. When the door 12 is made of wood, as shown, the slot 24 is formed by gaining out the inside face of the door.

I claim as my invention—

1. In combination with a car body having a door opening in a vertical wall thereof, a door sliding over the opening in front of the plane of the said vertical wall of the car body, the door being larger than the opening and overlying the said vertical wall of the car below the opening, and continuous intercalating T slot and T rail members, one of such members extending horizontally across the inside face of the door for its entire width and the other of such members extending horizontally across the said vertical wall of the car below the door opening the T-slot member being countersunk in the face of the part across which it extends.

2. In combination with a car body having a door opening in a vertical wall thereof, a continuous T rail extending horizontally across the said vertical wall of the car body below the door opening, a door sliding over the opening in front of the plane of the said vertical wall of the car body, the door being larger than the opening and extending below the same for its entire width, the said extended part of the door being provided with a continuous horizontally disposed T slot upon its inside face, said T slot being extended across the entire width of the door and being engaged with the said T rail, the throat of the T slot being of less width than the head of the T rail and embracing the web of the said T rail behind the head, and means covered by the door for securing the T rail to the said vertical wall of the car body.

JAMES W. RUMSEY.

Witnesses:
CHARLES B. GILLSON,
E. M. KLATCHER.

Copies of this patent may be obtained for five cents each, by addressing the "Commissioner of Patents, Washington, D. C."